United States Patent [19]

Lee, Jr.

[11] 4,383,082

[45] May 10, 1983

[54] POLYPHENYLENE ETHER RESIN COMPOSITIONS CONTAINING POLYOLEFIN IN HIGH AMOUNT

[75] Inventor: Gim F. Lee, Jr., Albany, N.Y.

[73] Assignee: General Electric Company, Pittsfield, Mass.

[21] Appl. No.: 326,200

[22] Filed: Dec. 1, 1981

[51] Int. Cl.³ .............................................. C08L 53/00
[52] U.S. Cl. ..................................... 525/92; 524/505; 525/90; 525/901; 525/905
[58] Field of Search ................... 525/90, 92, 905, 901; 524/505

[56] References Cited

U.S. PATENT DOCUMENTS

| | | | |
|---|---|---|---|
| 3,576,913 | 4/1971 | Johnson et al. | 264/150 |
| 4,166,055 | 8/1979 | Lee, Jr. | 525/92 |
| 4,196,116 | 4/1980 | Haaf et al. | 525/68 |

*Primary Examiner*—J. Ziegler
*Attorney, Agent, or Firm*—Hedman, Casella, Gibson, Costigan & Hoare

[57] ABSTRACT

Thermoplastic compositions of polyphenylene ether resin and diblock or radial teleblock copolymer of an alkenyl aromatic compound and a conjugated diene (which can be hydrogenated) containing polyolefin resin in large amount are described. The compositions are moldable into articles which do not exhibit the brittleness and tendency toward delamination often associated with use of large amounts of polyolefin.

7 Claims, No Drawings

POLYPHENYLENE ETHER RESIN COMPOSITIONS CONTAINING POLYOLEFIN IN HIGH AMOUNT

BACKGROUND OF THE INVENTION

The polyphenylene ethers are known as high performance engineering thermoplastic possessing high melt viscosities and softening points which makes them useful for many applications where resistance to high temperatures is desired. These materials are described in many publications, including Hay, U.S. Pat. Nos. 3,306,874 and 3,306,875 and Stamatoff, U.S. Pat. Nos. 3,257,357 and 3,257,358.

Certain properties of the polyphenylene ethers are undesirable for some uses, however. For example, parts molded or otherwise shaped from polyphenylene ether resins are somewhat brittle due to poor impact strength and are thus prone to fracturing or shattering. Also, the relatively high melt viscosities and softening points of the polymer sometimes cause difficulties in processing. Because of the high temperatures required to melt the resin and achieve good flow, special equipment is often necessary. Moreover, the resin is more susceptible to degradation and discoloration at such elevated temperatures.

It is now well known that properties of the polyphenylene ether resins can be altered materially by blending with other resin materials. For instance, Cizek discloses compositions of polyphenylene ether resin and polystyrene which are characterized by improved properties both during and after molding. See U.S. Pat. No. 3,383,435.

It is also known that when polyethylene, a polyolefin resin, is incorporated in polyphenylene ether resins and compositions, melt flow and other properties are substantially improved. The amount of polyethylene which can be incorporated has usually been very limited, however, due to delamination and brittleness in the resultant molded article.

It has recently been found that larger amounts of polyolefin resin can be successfully incorporated in a polyphenylene ether resin if certain elastomeric triblock copolymers are also present in the compositions.

Such compositions, which possess good melt flow and impact resistance properties, are described in U.S. Pat. No. 4,166,055 to Lee, Jr.

INTRODUCTION TO THE INVENTION

It has now been discovered that polyolefin can be compatibly admixed in large amount with polyphenylene ether resin if a diblock or radial teleblock copolymer of an alkenyl aromatic compound and a conjugated diene is also present. The diblock copolymer and radial teleblock copolymer each act as a "compatabilizer" for the polyolefin, enabling it to be homogeneously blended in substantial proportion with polyphenylene ether.

Because of the larger amount of polyolefin in the compositions, properties are upgraded. Moreover, parts molded from the composition do not exhibit the delamination and/or brittleness which normally accompanies use of large amounts of polyolefin.

DESCRIPTION OF THE INVENTION

The polyphenylene oxide resins useful in accordance with the present compositions are, as previously indicated, individually well known and readily available. There are, however, various preferred composition components.

The preferred polyphenylene ethers are homo- and copolymers of the formula:

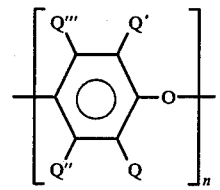

wherein Q, Q', Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q''' in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

The diblock A-B copolymers of an alkenyl aromatic compound, A, and a conjugated diene, B, are derived from alkenyl aromatic compounds having the formula:

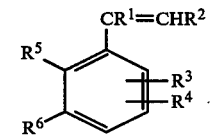

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with a hydrocarbyl group to form a naphthyl group.

Specific examples of alkenyl aromatic monomers include styrene, bromostyrene, chlorostyrene, a-methyl-styrene, para-methyl styrene, vinylxylene, divinylbenzene, vinyl naphthalene, and vinyl-toluene.

These are copolymerized with the polydiene, B, which is derived from, for example, 1,3-butadiene, 2-methyl-1,3-butadiene and 1,3-pentadiene.

The A-B block copolymers can be made by following procedures which are well known in the art or described in the patent literature, for example, in U.K. Pat. No. 1,145,923. These polymers are also commercially available, e.g., from Shell Chemicals under the trade designation Shellvis 50. Preferably, these are diblock copolymers in which the aliphatic unsaturation, as in block B, has been reduced by hydrogenation. Such copolymers will preferably have the average unsaturation of rubber block B decreased to less than 20%, and more preferably less than 10% of its original value.

Hydrogenation can be carried out using a variety of hydrogenating catalysts, such as nickel or Kieselguhr, Raney nickel, copper chromite, molybdenum sulfide, and finely divided platinum or other noble metals on a carrier.

Hydrogenation can be conducted at virtually any desired temperature or pressure, e.g., ranging from atmospheric to 3,000 p.s.i.g. and from 75° to 600° F., for up to 24 hours. Such procedures are well known.

The term "radial teleblock copolymer" defines a well known class of materials. These are commercially available or can be made by following procedures described in the patent literature, such as U.S. Pat. Nos. 3,595,942 and 4,090,996.

By way of illustration, a conjugated diene such as butadiene and a vinyl aromatic compound such as styrene are co-polymerized in the presence of an organometallic compound such as n-butyl lithium to produce a copolymeric product containing chains terminating in an active metal atom, e.g., lithium. These copolymers are reacted with a coupling agent having more than one active site capable of reacting with and replacing the terminal metal atom on the polymer chains. The resulting copolymer is characterized by a structure comprised of a centrally located coupling agent from which extend in various directions several chains of the copolymer. If hydrogenation is desired, the copolymer can then be hydrogenated in the known manner, for example, by procedures described in DeVault, U.S. Pat. No. 3,696,088.

The polyolefin is usually polyethylene, polypropylene, polyisobutylene, copolymers of ethylene and propylene, as well as copolymers of ethylene and organic esters such as ethylene vinyl acetate, ethylene ethyl acrylate, ethylene methyl acrylate, and so forth. These are commercially available or are otherwise prepared from the known teachings.

The polyphenylene ether resin and compatibilizer can be present in widely ranging proportions, but normally are present in weight amounts of from 4:1 to 1:2 of polyphenylene ether: compatibilizer (diblock copolymer or radial teleblock copolymer).

For best effectiveness, the polyolefin should be included in amounts of at least about 20 and more usually from 30 to 60 parts by weight based on the combined total of polyphenylene ether, compatibilizer and polyolefin.

Other ingredients can also be included in the compositions. These can be selected from among additives commonly employed with plastics, such as fillers and/or reinforcements, strengthening fibers, plasticizers, colorants, dyes, flame retardants, antioxidants, pigments, mold release agents, and so forth. Minor but effective amounts are selected normally ranging from 1 to 50 parts by weight of the total composition weight.

The compositions can be prepared using any of the known procedures. In one such procedure, a preblend on the ingredients is formed, extruded on a single or twin screw extruder at a temperature of between 400° and 550° F., chopped, cut or ground to smaller size and injection molded at temperatures of from 400° to 500° F. to desired shape and size.

The composition, due to the larger amount of polyolefin which can be homogeneously incorporated, is characterized by better melt flow and is more easily processed.

The invention is illustrated in the examples which follow. These are intended as best embodiments of the invention and are not to be construed as limiting the invention in any way. All parts are by weight.

EXAMPLES 1-3

The ingredients noted below were blended on a mixer and the resultant blend is extruded on a twin screw 28 mm Werner-Pfleiderer extruder or single screw Brabender extruder at 450° F., and molded at an injection temperature of 400° F., into test bars. The test bars were evaluated for tensile strength and elongation, with the results shown in the Table.

For purposes of comparison, other compositions not in accordance with the invention were also prepared, molded and tested under the same conditions. These are also noted in the Table below.

TABLE

| Ingredients, Parts* | COMPOSITION | | | | |
|---|---|---|---|---|---|
| | 1 | 2 | 3 | A** | B** |
| Poly(2,6-dimethyl-1,4-phenylene ether) resin (PPO, General Electric Co.) | 30 | 30 | 30 | 30 | 30 |
| A-B diblock copolymer of styrene and butadiene, (Shellvis 50, hydrogenated) | 20 | — | — | — | — |
| Radial teleblock copolymer of styrene and butadiene I (Phillips' Solprene 411) | — | 20 | — | — | — |
| Radial teleblock copolymer of styrene and butadiene II (Phillips' Solprene 512) | — | — | 20 | — | — |
| Isopropylated triphenyl phosphate (FMC's Kronitex 50) | 10 | 10 | 10 | — | 10 |
| Polyethylene (Rexene 126) | 50 | 50 | 50 | 50 | 50 |

| Properties | PROPERTIES | | | | |
|---|---|---|---|---|---|
| | 1 | 2 | 3 | A** | B** |
| Tensile strength, psi | 890 | 1020 | 1360 | 911 | 1070 |
| Tensile elongation, % | 22 | 26 | 74 | 20 | 13 |

*all compositions also contain three parts TiO$_2$
**control, no impact modifier present It can be seen that tensile elongation is markedly improved in the case of compositions 1, 2 and 3 versus control blends A and B, while the tensile strength is substantially maintained.

The above mentioned patents and/or publications are incorporated herein by reference. Obviously, other modifications and variations of the present invention are possible in light of the above teachings. For example, instead of poly(2,6-dimethyl-1,4-phenylene) ether there can be substituted poly(2,6-dimethyl-co-2,3,6-trimethyl-1,4-phenylene) ether copolymer. In addition, conventional reinforcements and/or fillers, flame retardants, stabilizers, colorants, impact modifiers can be used in conventional amounts. It is, therefore, to be understood that changes may be made in the particular embodiments of the invention described which are within the full intended scope of the invention as defined by the appended claims.

I claim:
1. A thermoplastic composition, comprising in intimate admixture:
   (a) a polyphenylene ether resin; and
   (b) in property improving combination, a polyethylene resin and a hydrogenated radial teleblock copolymer of an alkenyl aromatic compound and a conjugated diene, said polyethylene being present in an amount of at least 20 parts by weight based on the combined amount of (a) and (b).

2. A composition according to claim 1, in which the polyphenylene ether resin is poly(2,6-dimethyl-1,4-phenylene) ether.

3. A composition according to claim 1, in which the weight ratio of polyphenylene ether to radial teleblock copolymer is from 4:1 to 1:2.

4. A composition according to claim 1, in which the polymer is a radial teleblock copolymer of styrene, butadiene and a coupling agent.

5. A composition according to claim 1, in which the polyethylene is present in an amount between 30 and 60 parts by weight based on the combined amount of (a) and (b).

6. A composition according to claim 1, which also includes one or more additives selected from among flame retardants, fillers reinforcements, strengthening fibers, plasticizers, pigments and antioxidants.

7. A method for improving the compatibility of a mixture of polyethylene resin and polyphenylene ether resin, which comprises including in the mixture an effective amount of a polymer which is a hydrogenated radial teleblock copolymer of an alkenyl aromatic compound and a conjugated diene.

* * * * *